(12) United States Patent
Miller et al.

(10) Patent No.: US 6,773,653 B2
(45) Date of Patent: Aug. 10, 2004

(54) IN-MOLD LABELING METHOD

(75) Inventors: Dale Miller, Middleburg Hts., OH (US); Richard L. Sandt, Brunswick, OH (US); Scott Eastep, Westlake, OH (US)

(73) Assignee: Avery Dennison Corporation, Pasadena, CA (US)

( * ) Notice: Subject to any disclaimer, the term of this patent is extended or adjusted under 35 U.S.C. 154(b) by 327 days.

(21) Appl. No.: 09/972,474

(22) Filed: Oct. 5, 2001

(65) Prior Publication Data

US 2003/0067099 A1 Apr. 10, 2003

(51) Int. Cl.$^7$ .......................... B29C 33/18; B29C 35/08; B29C 45/14; B29C 71/04
(52) U.S. Cl. ........................ 264/447; 264/509; 264/259; 264/275
(58) Field of Search ................................ 264/446, 447, 264/483, 494, 496, 129, 132, 134, 136, 509, 510, 512, 513, 259, 271.1, 275, 279, 279.1; 428/35.7, 36.9, 36.91, 36.92

(56) References Cited

U.S. PATENT DOCUMENTS

| | | | |
|---|---|---|---|
| 2,862,832 A | 12/1958 | Shepherd, Jr. ............... 117/3.2 |
| 2,882,599 A | 4/1959 | Martin .......................... 30/294 |
| 2,990,311 A | 6/1961 | Shepherd, Jr. ............... 154/95 |
| 3,043,732 A | 7/1962 | Shepherd, Jr. ............... 156/230 |
| 3,108,850 A | 10/1963 | Brandt ........................... 18/55 |
| 3,207,822 A | 9/1965 | Makowski ..................... 264/94 |
| 3,231,419 A | 1/1966 | Korpman ..................... 117/122 |
| 3,239,478 A | 3/1966 | Harlan, Jr. .................... 260/27 |
| 3,380,868 A | 4/1968 | Moser .......................... 156/229 |
| 3,484,976 A | 12/1969 | Shea ............................. 40/310 |
| 3,503,826 A | 3/1970 | Nasica ......................... 156/245 |
| 3,616,015 A | 10/1971 | Kingston ..................... 156/230 |
| 3,625,752 A | 12/1971 | Korpman ..................... 117/122 |
| 3,676,202 A | 7/1972 | Korpman ..................... 117/122 |
| 3,723,170 A | 3/1973 | Korpman ..................... 117/122 |
| 3,733,002 A | 5/1973 | Fujio ............................. 215/12 |
| 3,758,661 A | 9/1973 | Yamamoto ................... 264/230 |
| 3,783,072 A | 1/1974 | Korpman ..................... 156/244 |
| 3,932,328 A | 1/1976 | Korpman ..................... 260/27 |
| 3,940,001 A | 2/1976 | Haefner et al. ................ 215/1 |
| 3,959,908 A | 6/1976 | Lowe ............................ 40/301 |
| 4,028,292 A | 6/1977 | Korpman ..................... 260/27 |
| 4,081,309 A | 3/1978 | Jenkins ........................ 156/250 |
| 4,137,081 A | 1/1979 | Pohl ............................... 96/87 |
| 4,174,218 A | 11/1979 | Pohl ............................. 430/306 |
| 4,175,460 A | 11/1979 | McPhail ....................... 83/856 |

(List continued on next page.)

FOREIGN PATENT DOCUMENTS

| | | |
|---|---|---|
| CA | 2044079 | 3/1992 |
| CA | 2012357 | 11/1999 |
| GB | 2 201 681 A | 7/1988 |
| JP | 2-217223 | 8/1990 |
| WO | 93/04842 | 3/1993 |
| WO | 0020199 | 4/2000 |

OTHER PUBLICATIONS

Water Ink Technologies, Inc., Technical Datasheet, X–Cel Water–Based Film Inks (Jan. 1, 1998).

(List continued on next page.)

Primary Examiner—Angela Ortiz
(74) Attorney, Agent, or Firm—Renner, Otto, Boisselle & Sklar, LLP

(57) ABSTRACT

The invention relates to an in-mold labeling method, and to molded plastic articles having an in-mold label as described herein. In one embodiment of the invention, the in-mold label film comprises: (A) a polymer facestock having a printable upper surface and a lower surface, (B) a print layer having an upper surface and a lower surface wherein the lower surface of the print layer is in contact with and adhered to the upper surface of the facestock, and (C) an adhesive layer having an upper surface and a lower surface wherein the lower surface is in contact with and adhered to the upper surface of the print layer.

62 Claims, 1 Drawing Sheet

U.S. PATENT DOCUMENTS

| | | | |
|---|---|---|---|
| 4,228,232 A | 10/1980 | Rousseau | 430/271 |
| 4,271,531 A | 6/1981 | Torii et al. | 455/182 |
| 4,355,967 A | 10/1982 | Hellmer | 425/503 |
| 4,359,314 A | 11/1982 | Hellmer | 425/503 |
| 4,377,616 A | 3/1983 | Ashcraft et al. | 428/213 |
| D269,154 S | 5/1983 | Freedman et al. | D8/98 |
| 4,393,115 A | 7/1983 | Yoshii et al. | 428/323 |
| 4,398,985 A | 8/1983 | Eagon | 156/233 |
| 4,406,411 A | 9/1983 | Gall et al. | 428/577 |
| 4,426,422 A | 1/1984 | Daniels | |
| 4,456,934 A | 6/1984 | Wedman et al. | 360/78 |
| 4,479,770 A | 10/1984 | Slat et al. | 425/503 |
| 4,479,771 A | 10/1984 | Slat et al. | 425/503 |
| 4,501,797 A | 2/1985 | Super et al. | 428/349 |
| 4,501,798 A | 2/1985 | Koschak et al. | 428/349 |
| 4,528,055 A | 7/1985 | Hattemer | 156/247 |
| 4,528,221 A | 7/1985 | Komatsuzaki et al. | 428/35 |
| 4,544,590 A | 10/1985 | Egan | 428/40 |
| 4,567,681 A | 2/1986 | Fumei | 40/310 |
| 4,582,752 A | 4/1986 | Duncan | 428/317.9 |
| 4,590,020 A | 5/1986 | Itaba et al. | 264/22 |
| 4,599,253 A | 7/1986 | Bree | 428/40 |
| 4,601,926 A | 7/1986 | Jabarin et al. | 428/35 |
| 4,616,992 A | 10/1986 | Oles | 425/503 |
| 4,626,455 A | 12/1986 | Karabedian | 428/35 |
| 4,639,207 A | 1/1987 | Slat et al. | 425/503 |
| 4,704,310 A | 11/1987 | Tighe et al. | |
| 4,704,323 A | 11/1987 | Duncan et al. | 428/286 |
| 4,705,714 A | 11/1987 | Itaba et al. | 428/215 |
| 4,710,338 A | 12/1987 | Bagnall et al. | 264/509 |
| 4,713,273 A | 12/1987 | Freedman | 428/40 |
| 4,720,416 A | 1/1988 | Duncan | 428/195 |
| 4,721,531 A | 1/1988 | Wildeman | |
| 4,721,638 A | 1/1988 | Matsuguchi et al. | 428/40 |
| 4,729,864 A | 3/1988 | Chang et al. | 264/509 |
| 4,737,098 A | 4/1988 | Oles et al. | 425/503 |
| 4,746,556 A | 5/1988 | Matsuguchi et al. | 428/40 |
| 4,758,396 A | 7/1988 | Crass et al. | 264/145 |
| 4,762,737 A | 8/1988 | Lu | 428/35 |
| 4,794,284 A | 12/1988 | Buon | 310/12 |
| 4,808,366 A | 2/1989 | Kaminski et al. | 264/509 |
| 4,824,912 A | 4/1989 | Su | 525/240 |
| 4,834,641 A | 5/1989 | Keyser | 425/503 |
| 4,837,075 A | 6/1989 | Dudley | 428/220 |
| 4,837,088 A | 6/1989 | Freedman | 156/243 |
| 4,855,187 A | 8/1989 | Osgood, Jr. et al. | 428/516 |
| 4,863,772 A | 9/1989 | Cross | 428/40 |
| 4,870,122 A | 9/1989 | Lu | 524/488 |
| 4,872,707 A | 10/1989 | deBruin | 283/102 |
| 4,873,088 A | 10/1989 | Mayhew et al. | 424/450 |
| 4,883,697 A | 11/1989 | Dornbusch et al. | 428/35.7 |
| 4,886,698 A | 12/1989 | Purdy | 428/213 |
| 4,892,689 A | 1/1990 | Van Cappellen et al. | 264/25 |
| 4,892,779 A | 1/1990 | Leatherman et al. | 428/220 |
| 4,904,324 A | 2/1990 | Heider | 156/214 |
| 4,911,873 A * | 3/1990 | Kuzuya et al. | 264/148 |
| 4,916,025 A | 4/1990 | Lu | 428/516 |
| 4,917,592 A | 4/1990 | Pletzer et al. | 425/503 |
| 4,925,714 A | 5/1990 | Freedman | 428/40 |
| 4,935,300 A | 6/1990 | Parker et al. | 428/352 |
| 4,946,532 A | 8/1990 | Freeman | 156/243 |
| 4,953,313 A | 9/1990 | Scott | 40/301 |
| 4,983,348 A | 1/1991 | Barresi et al. | 264/509 |
| 4,986,866 A | 1/1991 | Ohba et al. | 156/213 |
| 5,019,436 A | 5/1991 | Schramer et al. | 428/40 |
| 5,026,266 A | 6/1991 | Takasaki et al. | 425/150 |
| 5,026,592 A | 6/1991 | Janocha et al. | 428/204 |
| 5,032,344 A | 7/1991 | Kaminski | 264/509 |
| 5,042,842 A | 8/1991 | Green et al. | 283/101 |
| 5,073,435 A | 12/1991 | Eyraud et al. | 428/215 |
| 5,075,583 A | 12/1991 | Sakagami et al. | 310/12 |
| 5,076,977 A | 12/1991 | Maier et al. | 264/25 |
| 5,079,057 A | 1/1992 | Heider | 428/36.5 |
| 5,104,719 A | 4/1992 | Kamen et al. | |
| 5,126,197 A | 6/1992 | Schinkel et al. | 428/349 |
| 5,152,946 A | 10/1992 | Gillette | 264/230 |
| 5,186,782 A | 2/1993 | Freedman | 156/244.11 |
| 5,223,315 A | 6/1993 | Katsura et al. | 428/36.92 |
| 5,223,346 A | 6/1993 | Lu | 428/516 |
| 5,242,650 A | 9/1993 | Rackovan et al. | 264/509 |
| 5,284,681 A | 2/1994 | Shinonaga et al. | 427/316 |
| 5,284,688 A | 2/1994 | Hiatt | |
| 5,288,548 A | 2/1994 | Weber | 428/315.9 |
| 5,308,693 A | 5/1994 | Ryle et al. | 428/307.3 |
| 5,318,739 A * | 6/1994 | Katagiri et al. | 264/266 |
| 5,332,542 A | 7/1994 | Yamanaka et al. | 264/509 |
| 5,366,796 A | 11/1994 | Murschall et al. | 428/216 |
| 5,405,667 A | 4/1995 | Heider | 428/36.5 |
| 5,424,650 A | 6/1995 | Frick | 324/688 |
| 5,435,963 A | 7/1995 | Rackovan et al. | 264/509 |
| 5,443,767 A * | 8/1995 | Cahill | 264/37.31 |
| 5,475,075 A | 12/1995 | Brant et al. | 526/348.3 |
| 5,495,944 A | 3/1996 | Lermer | 206/459.1 |
| 5,562,962 A | 10/1996 | Tung | 428/200 |
| 5,585,193 A * | 12/1996 | Josephy et al. | 428/515 |
| 5,587,214 A | 12/1996 | Mitchell, Jr. | 428/40.1 |
| 5,595,810 A | 1/1997 | Beinert et al. | |
| 5,604,006 A | 2/1997 | Ponchaud et al. | 428/67 |
| 5,614,146 A | 3/1997 | Nakamura et al. | 264/511 |
| 5,709,937 A * | 1/1998 | Adams et al. | 428/332 |
| 5,711,839 A | 1/1998 | Dronzek, Jr. | 156/277 |
| 5,725,261 A | 3/1998 | Rahn | 292/307 |
| 5,725,962 A | 3/1998 | Bader et al. | 428/515 |
| 5,733,615 A | 3/1998 | Rackovan et al. | |
| 5,876,816 A | 3/1999 | Freedman | 428/40.1 |
| 6,001,208 A * | 12/1999 | Kinoshita et al. | 156/245 |
| 6,004,682 A | 12/1999 | Rackovan et al. | 428/518 |
| 6,146,744 A | 11/2000 | Freedman | 428/213 |
| 6,150,013 A | 11/2000 | Balaji et al. | 428/220 |
| 6,165,576 A * | 12/2000 | Freedman et al. | 428/36.91 |
| 6,228,486 B1 | 5/2001 | Kittel et al. | 428/354 |
| 6,294,236 B1 | 9/2001 | Freedman | 428/40.1 |
| 6,376,058 B1 * | 4/2002 | Schut et al. | 428/220 |
| 6,461,706 B1 * | 10/2002 | Freedman et al. | 428/40.1 |
| 6,482,287 B1 * | 11/2002 | De Gaulle | 156/245 |
| 6,508,902 B2 * | 1/2003 | Lind | 156/245 |
| 2001/0028952 A1 | 10/2001 | Nishizawa et al. | 428/336 |
| 2002/0050319 A1 | 5/2002 | Nishizawa et al. | 156/245 |

OTHER PUBLICATIONS

SunChemical, Flexible Packaging, Product Information Sheet for Sun Sheen, Aug. 1990.

SunChemical, Product Information Sheet for SUNTEX MP, Date unknown.

Sun Chemical Corporation, Health and Safety Dept., Material Safety Data Sheet for CLA91598F–Multibond Black, Apr. 9, 1998.

Sun Chemical Corporation, Health and Safety Dept., Material Safety Data Sheet for CLB04275F–Prokote Primer, Apr. 9, 1998.

Sun Chemical, Product Information Sheet for Prokote Primer RLB00201 F/S, Date unknown.

Sun Chemical, Product Information Sheet for SunCure Clear Coating RCA01302R, date unknown.

Hostaphan Polyester Film, Product Bulletin, 4LD4 Solvent Adherable Film, 10/96.

Rad–Cure Corp., Technical Data Sheet for RAD–CURE UV1008, 1990.

Sun Chemical Corp., Health and Safety Dept., Material Safety Data Sheet for RCA01302R–UV Coating, Apr. 9, 1998.

Union Carbide Research Product Technical Bulletin, UCC Polypropylene WRD–1057 (1997).

Chevron Chemical Co., Technical Data Sheet, Ethylene–Methyl Acrylate Copolymer, EMCA, SP2268PT, Sep. 16, 1994.

Ampacet Product Information, Slip PE MB, date unknown.

Ampacet Product Information, Product 10061, Jul. 28, 1998.

A. Schulman Inc., Product Information Sheet for Polybatch F 20, Jan. 28, 1996.

A. Schulman Inc., Product Information Sheet for Polybatch PF 92 D, Jan. 29, 1996.

A. Schulman Inc., Product Information Sheet for Polybatch White P8555 SD, Mar. 5, 1996.

Material Safety Data Sheet, A.J. Daw Printing Ink Co., Inc., Product Uvilith AR–109 Rubine Red, Apr. 14, 1997.

Adhesion and Bond, Encyclopedia of Polymer Science and Engineering vol. 1, p. 476–546, Interscience Publishers, 2nd Ed. 1985.

* cited by examiner

IN-MOLD LABELING METHOD

TECHNICAL FIELD OF THE INVENTION

This invention relates to methods of in-mold labeling, and to labeled molded products.

BACKGROUND OF THE INVENTION

It is often desirable to apply the labels, decals, logo plates, badges, graphics, or insignias (hereinafter collectively referred to as "labels") to an exterior surface of an article. One practice is to adhesively secure the label to the article after the article has been prepared. However, the adhesively secured label tends to be damaged during use and/or the label adheres poorly and may be partially or completely or removed from the article during use thereby giving the article an unattractive appearance.

It also is known that a label can be placed inside a mold cavity to in-mold the label to a thermoplastic article. For example, in an injection molding procedure, a label is placed in a mold cavity, and a thermoplastic resin is then injected into the mold cavity and against the label. Upon cooling, the label becomes embedded in the thermoplastic resin.

In-mold labeling procedures, however, are not without their own difficulties. For example, in-mold labeling is known to have problems with displacement of the label during the molding process due to pressure. Another problem observed in in-mold labeling is the distortion and/or "floating" of the label. Distortion is caused by using a construction material that is chemically different from the substrate. Distortion also can be caused by the pressure and the melting points of the material. Yet another problem is that when the label "floats", the label, in part or in whole, displaces into the injection fill material thus exposing little or no surface of the label on the surface of the substrate. The label literally is frozen inside of the material.

The in-mold labelling method of the present invention eliminates or reduces at least some of these problems by initially adhering the label to the mold itself which reduces displacement and/or distortion of the label.

SUMMARY OF THE INVENTION

The invention relates to an in-mold labeling method, and to molded plastic articles having an in-mold label as described herein. In one embodiment of the invention, the in-mold label film comprises: (A) a polymer facestock having a printable upper surface and a lower surface, (B) a print layer having an upper surface and a lower surface wherein the lower surface of the print layer is in contact with and adhered to the upper surface of the facestock, and (C) an adhesive layer having an upper surface and a lower surface wherein the lower surface is in contact with and adhered to the upper surface of the print layer.

DESCRIPTION OF THE INVENTION

Figure 1:
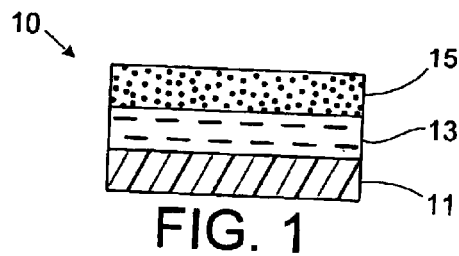
FIGS. 1–5 are cross sections of in-mold label constructions useful in the present invention.

The term "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer. The term "underlies" and cognate terms such as "underlying" and the like have similar meanings except that the first layer partially or completely lies under, rather than over, the second layer.

The term "transparent" when referring to one or more layers of the label film means that the ink or print layer(s) can be seen through such layer or layers.

The present invention, in one embodiment, relates to the discovery that the initial adherence of an in-mold label to the internal molding surface of a mold can be increased by providing in-mold labels wherein the surface of the label contacting the internal surface of the mold is an adhesive layer. The adherence of the label to the internal surface of the mold can be further improved by applying a static charge to the label before the label is applied to the internal surface of the mold. As a result of this adhesion of the label to the internal surface of the mold, there is virtually no movement or floating of the label during the molding process.

Accordingly, in one embodiment, the present invention relates to an in-mold labeling method comprising:

(A) providing an in-mold label comprising:
   (A-1) a polymer facestock having a printable upper surface and a heat activatable first adhesive lower surface; and
   (A-2) a layer of a second adhesive overlying the upper surface of the facestock wherein the second adhesive layer has an upper surface and a lower surface;
(B) positioning and adhering the label to an interior molding surface of a mold by contacting the upper surface of the second adhesive layer of the label with the internal molding surface of the mold,
(C) molding an article from a heated thermoplastic resin contained within the mold whereby the heated resin contacts the layer of heat-activatable adhesive of the label, and the label is molded to the article,
(D) cooling the labeled article, and
(E) removing the labeled article from the mold. In the process of the present invention, the label is inserted into a mold, and the label is held in the proper position by the second adhesive layer and, optionally by static electricity. The article is molded by injecting a molten plastic into the mold (injection molding) or by expanding a parison placed in the mold whereby the label is attached to the article via the first adhesive layer of the label.

In one embodiment the in-mold label comprises
(A-1) a polymer facestock having a printable upper surface and a heat activatable first adhesive lower surface; and
(A-2) a layer of a second adhesive overlying the upper surface of the facestock wherein the second adhesive layer has an upper surface and a lower surface;

The polymer facestocks utilized in this embodiment may comprise one or more layers of polymer material, and when more than one layer is utilized, the upper layer comprises a printable polymer film, and the lower layer comprises a heat-activatable (heat-seal) layer for subsequently bonding the film to a substrate in a mold. The polymeric films of the facestock of this embodiment may comprise at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polysulfone, polycarbonate, styrene-maleic anhydride copolymer, styrene-acrylonitrile copolymer, ionomers based on sodium or zinc salts of ethylene, methacrylic acid, cellulosics, or mixtures of two or more thereof. In one embodiment, the facestock may comprise a single layer of a polymer film such as polypropylene or a copolymer of propylene and a comonomer such as ethylene. The surfaces of the single layer are both ink printable and heat-activatable. Thus, one surface of the film may be printed with ink and the other surface, when heated in the mold, will soften and stick to the polymer article being formed in the mold. A single layer of polyurethane can also be used, particularly when the article being molded comprises polyurethane.

The above described in-mold labels useful in the process of the present invention may further comprise a print layer positioned between the upper surface of the facestock and the second adhesive layer. In addition, the label may further comprise a carrier sheet overlying the upper surface of the second adhesive layer, which carrier sheet is removed prior to contacting the label to an internal molding surface as described more fully hereinafter.

In the above embodiments and in other embodiments of the present invention, as will be described more fully hereinafter, the labels utilized in the method may further comprise an abrasion resistant, chemical resistant, and/or ultraviolet resistant transparent coating layer(s) positioned between the print layer and the second adhesive layer. In addition, the labels may further comprise an adhesion promoting layer positioned between the various layers such as between the print layer and the facestock to improve the adhesion of the print layer to the facestock and/or between a print layer and the heat-activated adhesive layer to improve the adhesion of the heat-activated adhesive layer to the print layer. In some embodiments, the upper surface of the facestock may be treated to improve the adhesion of the print layer to the facestock. Examples of useful treatments include corona treatment, flame treatment, plasma treatment, etc.

In another embodiment of the invention, the in-mold labels utilized in the labeling method of the present invention comprise:

(A-1) a facestock having an upper surface and a lower surface wherein the upper surface is ink-printable;

(A-2) a layer of a heat-activatable first adhesive underlying the lower surface of the facestock; and (A-3) a layer of a second adhesive overlying the upper surface of the facestock.

The labels may further comprise one or more of the following:

a print layer positioned between the upper surface of the facestock and the second adhesive layer;

a print layer positioned between the lower surface of the facestock and the layer of heat-activatable first adhesive;

one or more adhesion promoting layers (e.g., tie layers) between any two layers of the labels to improve the adhesion between the two layers;

a carrier sheet overlying the upper surface of the second adhesive layer, which carrier sheet is removed prior to positioning and contacting the upper surface of the second adhesive layer to the internal molding surface; and one or more transparent coating layers positioned between the print layer and the second adhesive layer; which transparent layers may be abrasion resistant, chemical resistant, and/or ultraviolet resistant transparent coating layers; all of which are described more fully below.

Some examples of such in-mold label films useful in the present invention are illustrated in FIGS. 1–5. FIG. 1 illustrates an example of an in-mold label film useful in the present invention wherein the facestock comprises a single layer. In the embodiment illustrated in FIG. 1, the in-mold label film 10 is shown as comprising a facestock layer 11 having an upper surface and a lower surface, a print layer 13 having an upper surface and a lower surface wherein the lower surface of the print layer 13 is in contact with and adhered to the upper surface of the facestock 11, and an adhesive layer 15 having an upper surface and a lower surface wherein the lower surface of the adhesive layer 15 is in contact with and adhered to the upper surface of the print layer 13. Although not shown in FIG. 1, a carrier sheet or release liner may be placed in contact with the upper surface of the adhesive layer 15 to protect the surface of the adhesive during shipping and until the label is ready to be used.

Figure 2:
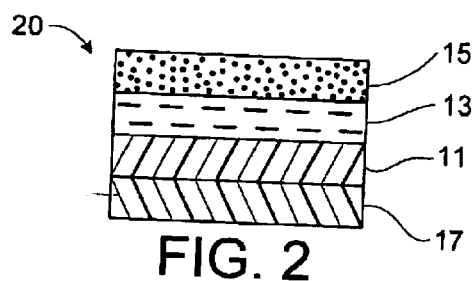

FIG. 2 illustrates an in-mold label film indicated by reference numeral 20 which comprises a facestock 11; a layer of heat-activatable first adhesive material 17 underlying the facestock 11; a layer of a second adhesive 15 overlying the upper surface of the facestock 11; and a print layer 13 having an upper surface and a lower surface wherein the print layer is positioned between the facestock 11 and the second adhesive layer 15.

Figure 3:
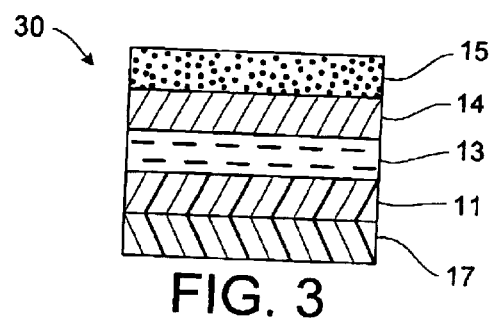

FIG. 3 illustrates yet another embodiment of the in-mold label useful in the present invention, and the label 30 comprises facestock layer 11; a heat-activatable layer 17 for bonding the film to a polymer substrate; a print layer 13 having an upper surface and a lower surface wherein the lower surface of the print layer 13 is in contact with and adhered to the upper surface of the facestock 11; a transparent overcoat layer 14 (e.g., a layer of material which imparts a desirable property such as abrasion resistance, weather resistance, etc. to the label) having an upper surface and a lower surface wherein the lower surface of the overcoat layer 14 is in contact with and adhered to the upper surface of print layer 13; and a second adhesive layer 15 having an upper surface and a lower surface wherein the lower surface of the adhesive layer 15 is in contact with the upper surface of the overcoat layer 14.

Figure 4:
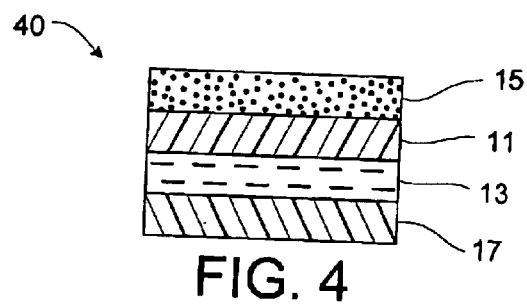

FIG. 4 illustrates in-mold label useful in the method of the invention wherein the print layer underlies the facestock layer. Thus, the label 40 comprises a facestock 11; a heat activatable first adhesive layer 17; a print layer 13 positioned between the lower surface of the facestock 11 and the upper surface of the heat activatable second adhesive layer 17; and a second adhesive layer 15 overlying the facestock 11. In one embodiment the layers above the print layer 13, namely layers 11 and 15 are transparent so that the print layer is visible after the label is molded to the molded article.

In yet another embodiment similar to the one illustrated in FIG. 4, the label may contain two different print layers, one below or underlying the facestock (e.g., 13) and one overlying the facestock (not shown in FIG. 4.), and the facestock 11 may be opaque while the first and second adhesive layers 17 and 15 are transparent. When this label is molded to a clear article, the print layer overlying the facestock is visible from the outside of the article, and the print layer underlying the facestock layer is visible through the container (e.g., a hidden message when the container is full becomes visible when the container is empty or partially empty.

Figure 5:
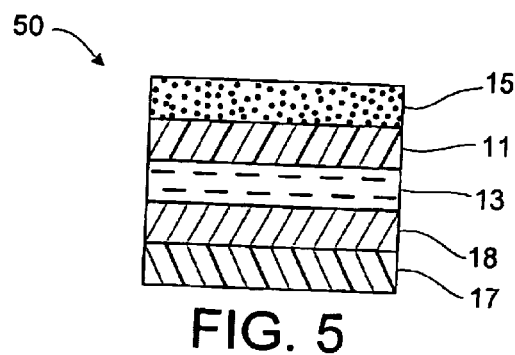

FIG. 5 illustrates another in-mold label useful in the method of the invention wherein the print layer underlies the facestock layer. Label 50 comprises a facestock 11, a print layer 13 underlying and in contact with the facestock 11, a heat activatable first adhesive layer 17, an adhesion promoting layer 18 between the ink layer 13 and the heat activatable first adhesive layer 17, and a second adhesive layer 15 overlying the facestock 11. The adhesion promoting layer 18 improves the adhesion of the heat activatable adhesive layer 17 to the print layer 13. The labels as illustrated in FIG. 5 can be prepared, in one embodiment, by preparing a two layer film comprising facestock 11 and second adhesive 15 and as by coextrusion; printing the lower surface of the facestock 11; and attaching a preformed layer of a first adhesive 17 to the print layer 13 using an adhesion promoting layer 18. Layers 17 and 18 may be formed initially as a laminate which can then be adhesively attached to the print layer 13.

In the embodiments of the present invention wherein the in-mold label utilized in the method comprises a facestock and a separate layer of heat-activatable first adhesive, the facestock may comprise a polymer film, a textile, paper, foil, or a metallized polymer film, or the facestock may comprise at least two layers of material such as one layer of polymer and one layer of foil; one layer of polymer and one layer of paper; two layers of polymers; etc.

The facestock, or a layer of the facestock may be comprised of textile materials including woven and non-woven fabrics made of natural or synthetic fibers. The metal foils which can be utilized as the facestock or a layer of the facestock in the labels utilized of the present invention may include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorous, chromium/molybdenum, nickel/chromium, nickel/phosphorous, etc. The above metal foils can be utilized, as mentioned above, by themselves, or they can be joined or adhered to a polymer sheet or film to form a multilayered laminate or facestock.

The paper sheets include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The facestock may be comprised of a polymer-coated paper which is basically a sheet of paper that is coated on either one or both sides with a polymer coating. The polymer coating, which may be comprised of a high, medium, or low density polyethylene, polypropylene, polyester, and other similar polymer films, is coated on the paper surface to add strength and/or dimensional stability. The weight of these types of coated paper facestocks can vary over a wide range with weights in the range of about 5 to about 50 lb/ream being useful. In total, the final coated paper facestock may be comprised of between about 10% and about 40% by weight polymer. For two-sided coatings, the quantity of polymer is usually approximately evenly divided between the top and bottom surface of the paper.

A wide variety of polymer film materials are useful in preparing the facestock of the in-mold labels useful in the present invention. For example, the polymer film material may include polymers and copolymers such as at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of ethylene methacrylic acid, cellulosics, polyacrylonitrile alkylene-vinyl acetate copolymer, or mixtures of two or more thereof.

The polyolefins which can be utilized as the polymer face film material include polymers and copolymers of olefin monomers containing 2 to about 12 carbon atoms such as ethylene, propylene, 1-butene, etc., or blends of mixtures of such polymers and copolymers. In one embodiment the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymer film material including low, medium, and high density polyethylenes, and mixtures thereof. An example of a useful low density polyethylene (LDPE) is Rexene 1017 available from Huntsman. An example of a useful high density polyethylene (HDPE) is Formoline LH5206 available from Formosa Plastics. In one embodiment the polymer film material comprises a blend of 80 to 90% HDPE and 10–20% of LDPE.

The propylene homopolymers which can be utilized as the polymer film material in the adhesive composites useful in the invention, either alone, or in combination with a propylene copolymer as described herein, include a variety of propylene homopolymers such as those having melt flow rates (MFR) from about 0.5 to about 20 as determined by ASTM Test D 1238. In one embodiment, propylene homopolymers having MFR's of less than 10, and more often from about 4 to about 10 are particularly useful. Useful propylene homopolymers also may be characterized as having densities in the range of from about 0.88 to about 0.92 g/cm$^3$. A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

Examples of useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, N.J. under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695. Some of the physical properties of polymer films formed from the Uni-Rez polyamides are summarized in the following Table I.

TABLE I

| Uni-Rez Product | Softening Point (° C.) | Brookfield Viscosity (cPs at 190° C.) | Tensile Strength (PSI) | Percent Ultimate Elongation |
|---|---|---|---|---|
| 2620 | 105 | 900 | 1000 | 50 |
| 2623 | 106 | 6500 | 1000 | 400 |
| 2665 | 165 | 11,000 | 2000 | 500 |
| 2695 | 128 | 5000 | 200 | 175 |
| 2620/2623 (blend at 1:3) | 128 | 5100 | 1000 | 313 |

Polystyrenes can also be utilized as the polymer facestock material and these include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillips Petroleum Co. KR-10 is believed to be a copolymer of styrene with 1,3-butadiene.

Polyurethanes also can be utilized as the polymer film material, and the polyurethanes may include aliphatic as well as aromatic polyurethanes.

The polyurethanes are typically the reaction products of (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, and Sancure 12471® (all of which are commercially available from BFGoodrich, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia Resins), and NeoRez R-960 (Avecia Resins).

Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the facestocks comprises at least one polyester polyurethane. Examples of these urethanes include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company ICI, and the acrylic copolymer dispersion sold under the name "Neocryl XK-90" by the company Avecia.

Polyesters prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from duPont is Selar PT-8307 which is polyethylene terephthalate.

Acrylate polymers and copolymers and alkylene vinyl acetate resins (e.g., EVA polymers) also are useful as the film forming materials in the preparation of the adhesive constructions of the invention. Commercial examples of available polymers include Escorene UL-7520 (Exxon), a copolymer of ethylene with 19.3% vinyl acetate; Nucrell 699 (duPont), an ethylene copolymer containing 11% of methacrylic acid, etc.

Ionomers (polyolefins containing ionic bonding of molecular chains) also are useful. Examples of ionomers include ionomeric ethylene copolymers such as Surlyn 1706 (duPont) which is believed to contain interchain ionic bonds based on a zinc salt of ethylene methacrylic acid copolymer. Surlyn 1702 from duPont also is a useful ionomer.

Polycarbonates also are useful, and these are available from the Dow Chemical Co. (Calibre) G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In one embodiment, the facestock polymer material may comprise fluorinated polymer. The fluorinated polymer includes a thermoplastic fluorocarbon such as polyvinylidene fluoride (PVDF). The fluorinated polymer also can include copolymers and terpolymers of vinylidene fluoride. A useful thermoplastic fluorocarbon is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The polymer facestock material may be free of inorganic fillers and/or pigments for clear facestocks and clear labels, or the polymer facestock material may contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, anti-blocking agents, processing aids, acid acceptors, etc.

Various nucleating agents and pigments can be incorporated into the facestock and/or other layers comprising polymers in the labels used in the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the die-cuttability of the facestock. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3, 2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, (a concentrate of 10% Millad 3988 and 90% polypropylene), Millad 3988 and Millad 3905 are sorbitol nucleating agents available from Milliken Chemical Co.

The amounts of nucleating agent incorporated into the film formulations useful in the present invention generally range from about 100 to about 6000 ppm of the film. In another embodiment, the amount of nucleating agent is in the range of about 1000 to about 5000 ppm, more preferably of about 1500 to 3500 ppm, more preferably about 2000 to 2500 ppm.

The polymer facestock material is chosen to provide a continuous polymer film in the film structures of this invention with the desired properties such as improved tensile strength, elongation, impact strength, tear resistance, and optics (haze and gloss). The choice of polymeric facestock forming material also is determined by its physical properties such as melt viscosity, high speed tensile strength, percent elongation etc.

The thickness of the polymer facestock is from about 0.1 to about 10 mils, or from about 4 to about 10 mils. In one embodiment the thickness of the facestock is from about 5 to about 8 mils. As noted above, the facestock may comprise a single layer, or the film can be a multilayer film of two or more adjacent layers. For example the film can comprise one layer of a polyolefin and one layer of a blend of a polyolefin and a copolymer of ethylene and vinyl acetate (EVA). In another embodiment the film comprises three layers, a base or core layer of, for example, a polyolefin, and skin layers in both sides of the base or core layer which may be comprised of the same or different polymer blends. The individual layers of a multilayer facestock may be selected to provide desirable properties.

The monolayer and multilayer film facestocks useful in the labels useful herein can be manufactured by those processes known to those skilled in the art such as by casting, coating or extrusion. In one embodiment, the films are manufactured by polymer extrusion or coextrusion processes. The extrudate or coextrudate of polymeric film materials is formed by simultaneous extrusion from a suitable known type of extrusion or coextrusion die, and in the case of a coextrudate, the layers are adhered to each other in a permanently combined state to provide a unitary coextrudate. When one of the layers of the facestock is a heat seal layer (as described below), care must be taken to prevent activation of the heat seal layer during the coextrusion process.

In addition to coextrusion, the multilayer film facestocks useful in the present invention may be prepared by extrusion of a continuous film to form one layer followed by the application of one or more additional layers on the extruded layer by extrusion of one or more additional layers; by lamination of a preformed polymer film to a preformed functional film such as the heat seal layer; or by deposition of additional layers on the preformed film from an emulsion or solution of a polymeric film forming material.

One of the advantages of the labels of the present invention is that the facestock does not need to be oriented, either uniaxially or biaxially, in order to provide a useful label. Since the label is adhered to the internal surface of a mold by the second adhesive layer, migration or floating of the label during the molding process is minimized or eliminated, and many of the difficulties obtained with other in-mold labels are avoided. Accordingly, in one embodiment, the facestock and any other film layers utilized in the in-mold labels used in the present invention are not oriented. That is, the facestock and films are not subjected to a hot-stretching and annealing step. In other embodiments, the facestock and films contained in the in-mold labels used in the present invention may be subjected to hot-stretching and annealing by techniques well known to those skilled in the art. For example, the films may be hot-stretched in the machine direction only at a ratio of at least 2:1 to 1 and more often, at a ratio of between about 2:1 to about 9:1. After the film has been hot stretched, it is generally passed over annealing rolls where the film is annealed or heat-set at temperatures in the range of from about 50° C., more often 100° C. to about 150° C., followed by cooling. Such orientation provides the films with properties such as an increase in the stiffness of the film, and in some instances, improved printability. Alternatively, in some embodiments, the film may be biaxially oriented.

In one embodiment, the polymer facestock comprises at least one upper layer and one lower layer wherein the upper layer comprises a printable polymer film as described above, and the lower layer comprises a heat-activatable first adhesive layer.

The heat-activatable first adhesive or heat-seal layer is a layer of material which is activated by heat during the molding process to improve bonding of the label to a plastic article in the molding process. Materials for the heat-activatable first adhesive layer may comprise any heat-activatable adhesive or thermoplastic film material. Such materials include but are not limited to the following film-forming materials used alone or in combination such as polyolefins, (linear or branched), metallocene catalyzed polyolefins, syndiotactic polystyrenes, syndiotactic polypropylenes, cyclic polyolefins, polyacrylates, polyethylene ethyl acrylate, polyethylene methyl acrylate, acrylonitrile butadiene styrene polymer, ethylene-vinyl alcohol copolymer, ethylene-vinyl acetate copolymers, polyamides such as nylon, polystyrenes, polyurethanes, polysulfones, polyvinylidene chlorides, polycarbonates, styrene maleic anhydride polymers, styrene acrylonitrile polymers, ionomers based on sodium or zinc salts of ethylene/methacrylic acid, cellulosics, fluoroplastics, polyacrylonitriles, and thermoplastic polyesters. More specific examples are the acrylates such as ethylene methacrylic acid, ethylene methyl acrylate, ethylene acrylic acid and ethylene ethyl acrylate. Also, included are polymers and copolymers of olefin monomers having, for example, 2 to about 12 carbon atoms, and in one embodiment 2 to about 8 carbon atoms. These include the polymers of $\alpha$-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyolefins include amorphous polyolefins. The polyethylenes that are useful in the heat seal layer include those with various densities including low, medium and high density ranges. The ethylene/methyl acrylate copolymers available from Chevron under the tradename EMAC can be used. These include EMAC 2260, which has a methyl acrylate content of 24% by weight and a melt index of 2.0 grams/10 minutes @ 190° C., 2.16 Kg; and EMAC SP 2268T, which also has a methyl acrylate content of 24% by weight and a melt index of 10 grams/10 minutes @ 190° C., 2.16 Kg. Polymer film materials prepared from blends of copolymers or blends of copolymers with homopolymers are also useful.

Also, the heat activatable first adhesive layer may contain antiblock additives (such as silica, diatomaceous earth, synthetic silica, glass spheres, ceramic partides, etc.) This layer also may contain an antistatic additive (such as an amine or an amide or a derivative of a fatty acid).

The heat activatable adhesive layer is designed for and activated at temperatures known to those skilled in the art. Generally the heat-activatable first adhesive layer has a lower melting point than any of the other layers of the in-mold label. While the heat activatable layer may activate at temperatures below those specified for activation, the layer is designed to activate at certain temperatures based on the substrate material under normal in-mold labeling conditions. In one embodiment, the heat activatable adhesive layer activates at temperatures between about 80° C. to about 300° C., more often the heat seal layer activates at temperatures between about 87° C. to about 250° C.

The polymer facestock and the heat activatable first adhesive layer may be formed by simultaneous extrusion from two or more extruders with a suitable coextrusion die whereby the facestock and first adhesive layer are adhered to each other in a permanently combined state to provide a unitary coextrudate. A tie layer (adhesion promoting layer) may also be coextruded with the facestock and the heat-activatable first adhesive layer to improve the adhesion of the heat-activatable layer to the facestock. Alternatively, a coating process may be used to lay down a layer of the heat-activatable material on the facestock, or the two layers can be formed separately and thereafter laminated together with or without the acid of an adhesive layer.

The labels used in the present invention may, and generally do, comprise one or more print layers. In one embodiment, illustrated in FIGS. 1–3, a print layer is adhered to the upper surface of the facestock. In another embodiment, illustrated in FIGS. 4–5, a print layer underlies and is adhered to the lower surface of the facestock. In yet another embodiment, the label may contain two print layers, one overlying the facestock and a second print layer underlying the facestock.

The print layer may be an ink or graphics layer, and the print layer may be a mono-colored or multi-colored print layer depending on the printed message and/or the intended pictorial design. These include, variable imprinted data such as serial numbers, bar codes, trademarks, etc. The thickness of the print layer is typically in the range of about 0.5 to about 10 microns, and in one embodiment about 1 to about 5 microns, and in another embodiment about 3 microns. The inks used in the print layer include commercially available water-based, solvent-based or radiation-curable inks. Examples of these inks include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In one embodiment, the print layer comprises a polyester/vinyl ink, a polyamide ink, an acrylic ink and/or a polyester ink. The print layer is formed in the conventional manner by depositing, by gravure printing or the like, an ink composition comprising a resin of the type described above, a suitable pigment or dye and one or more suitable volatile solvents onto one or more desired areas of lacquer layer. After application of the ink composition, the volatile solvent component(s) of the ink composition evaporate(s), leaving only the non-volatile ink components to form the print layer. An example of a suitable resin for use in forming a polyester ink is ViTEL® 2700 (Shell Chemical Company, Akron, Ohio)—a copolyester resin having a high tensile strength (7000 psi) and a low elongation (4% elongation). A ViTEL® 2700-based polyester ink composition may comprise 18% ViTEL® 2700, 6% pigment, 30.4% n-propyl acetate (NP Ac) and 45.6% toluene. As can readily be appreciated, ViTEL® 2700 is, by no means, the only polyester resin that may be used to formulate a polyester ink, and solvent systems, other than an NP Ac/toluene system, may be suitable for use with ViTEL® 2700, as well as with other polyester resins. An example of a polyester adhesive composition comprises 10.70%, by weight, ViTEL® 2300 polyester resin; 10.70%, by weight, ViTEL® 2700 polyester resin; 1.1%, by weight, BENZOFLEX S404 plasticizer; 1.1%, by weight, HULS 512 adhesion promoter; 19.20%, by weight, toluene; and 57.10%, by weight, methyl ethyl ketone.

The adhesion of the ink to a surface of the facestock can be improved, if necessary, by techniques well known to those skilled in the art. For example, the surface energy of the facestock can be enhanced (and in adhesion of the ink improved) by treatments such as corona discharge, flame, plasma, etc, or a primer coating (adhesion promoter) can be applied to the surface to be printed. Corona treatment involves discharging up to about 10,000 volts of electricity from an electrode (ceramic) to a ground roll over which the film (facestock) is passing. This high voltage, called "corona" alters the surface of the facestock and allows for enhanced printing. Similar results can be obtained with plasma and flame treatments.

Useful ink primers may be transparent or opaque and the primers may be solvent based or water-based. In one embodiment, the primers are radiation curable (e.g., UV). The ink primer is typically comprised of a lacquer and a diluent. The lacquer is typically comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as toluene and xylene; ketones such as acetone and methyl ethyl ketone; aliphatic hydrocarbons such as heptane; and mixtures thereof. The ratio of lacquer to diluent is dependent on the viscosity required for application of the ink primer, the selection of such viscosity being within the skill of the art. An example of a ink primer material that can be used is CLB04275F-Prokote Primer (a product of Sun Chemical Corporation identified as a solvent based primer useful with inks and coatings). The ink primer layer may have a thickness of from about 1 to about 4 microns or from about 1.5 to about 3 microns.

The adhesion of the heat-activatable first adhesive to the ink layer when the ink layer is between the facestock and the first adhesive layer can be improved by the presence of an adhesion promoting layer between the ink layer and the first adhesive layer as illustrated in FIG. 5. The adhesion promoting layer may comprise any of the known pressure sensitive adhesives, ultraviolet (UV) curable adhesives, or heat activated adhesives. In one embodiment, the adhesive is a UV cured press applied adhesive.

A transparent polymer topcoat or overcoat layer may be present in the in-mold label films useful in the invention. In the embodiment illustrated in FIG. 3, a transparent topcoat or overcoat layer 14 is present between the print layer 13 and the second adhesive layer 15. The topcoat or overcoat layer may provide desirable properties to the label after the label is affixed to an article in a molding operation. The presence of a transparent topcoat layer over the print layer may, in some embodiments provide additional properties such as stiffness and/or weatherability, and the topcoat may protect the print layer from, e.g., weather, sun, abrasion, moisture, water, etc. The transparent topcoat layer can enhance the properties of the underlying print layer to provide a glossier and richer image. The transparent topcoat layer may also be designed to be abrasion resistant, radiation resistant (e.g, UV), thermally resistant thereby protecting the label and, particularly the print layer from degradation from such causes. The topcoated constructions of the labels used in the invention may also be selected to provide labels useful on molded articles subjected to subsequent liquid processing such as bottle washing/rinsing, filling and pasteurization, or liquid immersion (e.g., ice bath) without displaying adverse consequences such as label lifting or hazing. The topcoat layer may be applied to the print layer by techniques known to those skilled in the art. The polymer film may be deposited from a solution, applied as a preformed film (laminated to the print layer), etc.

When a transparent topcoat or overcoat layer is present, it may have a single layer or a multilayered structure. The thickness of the thermoplastic film of the topcoat protective layer is generally in the range of about 0.5 to about 5 mils, and in one embodiment about 1 to about 3 mils. Examples of the topcoat layers are described in U.S. Pat. No. 6,106,982 which is incorporated herein by reference.

The topcoat may comprise polyolefins, thermoplastic polymers of ethylene and propylene, polyesters, polyurethanes, polyacryls, polymethacryls, vinyl acetate homopolymers, co- or terpolymers, ionomers, and mixtures thereof.

In one embodiment, the topcoat material is a polyolefin. The polyolefins which can be utilized as the topcoat material include polymers and copolymers of ethylene, propylene, 1-butene, etc., or blends of mixtures of such polymers and copolymers. In one embodiment, the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the topcoat material including low, medium, and high density polyethylenes. An example of a useful low density polyethylene (LDPE) is Rexene 1017 available from Huntsman.

The propylene homopolymers which can be utilized as the topcoat material in the constructions of the invention, either alone, or in combination with a propylene copolymer as described herein, include a variety of propylene homopolymers such as those having melt flow rates (MFR) from about 0.5 to about 20 as determined by ASTM Test D 1238, condition L.A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one embodiment, the propylene copolymers are propylene-ethylene copolymers with ethylenic contents with from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation D56D20. Another Union Carbide propylene-ethylene copolymer is D56D8, which contains 5.5% by weight of ethylene.

In another embodiment, the topcoat comprises at least one thermoplastic copolymer or terpolymer derived from ethylene or propylene and a functional monomer selected from the group consisting of alkyl acrylate, acrylic acid, alkyl acrylic acid, and combinations of two or more thereof. In one embodiment, the functional monomer is selected from alkyl acrylate, acrylic acid, alkyl acrylic acid, and combinations of two ore more thereof. The alkyl groups in the alkyl acrylates and the alkyl acrylic acids typically contain 1 to about 8 carbon atoms, and, in one embodiment, 1 to about 2 carbon atoms. The functional monomer(s) component of the copolymer or terpolymer ranges from about 1 to about 15 mole percent, and, in one embodiment, about 1 to about 10 mole percent of the copolymer or terpolymer molecule. Examples include: ethylene/methyl acrylate copolymers; ethylene/ethylacrylate copolymers; ethylene/butyl acrylate copolymers; ethylene/methacrylic acid copolymers; ethylene/acrylic acid copolymers; anhydride-modified low density polyethylenes; anhydride-modified linear low density polyethylene, and mixtures of two or more thereof.

Ethylene acid copolymers are available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97° C. and a $T_g$ of about −7.7° C. The ethylene/methyl acrylate copolymers available from Chevron under the tradename EMAC can be used. These include EMAC 2205, which has a methyl acrylate content of 20% by weight and a melting point of 83° C., and EMAC 2268, which has a methyl acrylate content of 24% by weight, a melting point of about 74° C. and a $T_g$ of about −40.6° C.

In one embodiment, the topcoat may comprise at least one polyester. Polyesters are prepared from various glycols (including ethylene glycol, propylene glycol, neopentyl glycol, etc.) or polyols (glycerol, trimethylolpropane, pentaeythritol, etc.) and one or more aliphatic or aromatic carboxylic acids. Polyethylene terephthalate (PET) and PETG (PET modified with cyclohexanedimethanol) are useful and are available from a variety of commercial sources including Eastman. For example, Kodar 6763 is a PETG available from Eastman Chemical. Another useful polyester from duPont is Selar PT-8307 which is polyethylene terephthalate. Another useful polyester is polyethylene naphthanate.

In one embodiment, the topcoat is at least one polyurethane. The polyurethanes described above with respect to the facestock can be utilized also on the overcoat or topcoat.

In another embodiment, the topcoat is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins includes those derived from acrylic acid, acrylate esters, acrylamide, methacrylic acid, methacrylate esters, and methacrylamide. The acrylate and methacrylate ester generally contain from 1 to about 30 carbon atoms in the pendant group, or from 1 to about 18, or from 2 to about 12 carbon atoms in the pendant group.

Examples of commercial polyacryls and polymethacryls include Gelva® 2497 (commercially available from Monsanto Co., St. Louis, Mo.), Duraplus® 2 (commercially available from Rohm & Haas Co., Philadelphia, Pa.), Joncryl® 95 (commercially available from S. C. Johnson Polymer, Sturtevant, Wis.), SCX-1537 (S. C. Johnson Polymer), SCX-1959 (S. C. Johnson Polymer), SCX-1965 (S. C. Johnson Polymer), Joncryl® 530 (S. C. Johnson Polymer), Joncryl® 537 (S. C. Johnson Polymer), Glascol LS20 (commercially available from Allied Colloids, Suffolk, Va.), Glascol C37 (Allied Colloids), Glascol LS26 (Allied Colloids), Glascol LS24 (Allied Colloids), Glascol LE45 (Allied Colloids), Carboset® CR760 (commercially available from BFGoodrich, Cleveland, Ohio), Carboset® CR761 (BFGoodrich), Carboset® CR763 (BFGoodrich), Carboset® 765 (BFGoodrich), Carboset® 19X2 (BFGoodrich), Carboset® XL28 (BFGoodrich), Hycar 26084 (BFGoodrich), Hycar 26091 (BFGoodrich), Carbobond 26373 (BFGoodrich), Neocryl® A-601 (commercially available from Avecia Resins, Wilmington, Mass.)Neocryl® A-612 (Avecia Resins), Neocryl® A-6044 (Avecia Resins), Neocryl® A-622 (Avecia Resins), Neocryl® A-623 (Avecia Resins), Neocryl® A-634 (Avecia Resins), and Neocryl® A-640 (Avecia Resins).

In another embodiment, the topcoat is a polyvinylchloride resin (sometimes referred to herein as PVC resins). These resins are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides, such as vinyl fluoride and vinyl bromide; alpha-olefins, such as ethylene, propylene and butylene; vinyl esters, such as vinyl acetate, vinyl propionate, vinyl butyrate and vinyl hexanoate, or partially hydrolyzed products thereof, such as vinyl alcohol; vinyl ethers, such as methyl vinyl ether, propyl vinyl ether and butyl vinyl ether; acrylic esters, such as methyl acrylate, ethyl acrylate, methyl methacrylate and butyl methacrylate and other monomers, such as acrylonitrile, vinylidene chloride and dibutyl maleate. Such resins are generally known any many are commercially available. A particularly useful polyvinylchloride resin is the homopolymer of vinyl chloride.

Examples of polyvinylchloride resins that are commercially available include GEON® 92, a medium high molecular weight porous suspension PVC resin; GEON® 128, a high molecular weight dispersion grade polyvinylchloride resin; and GEON® 11X 426FG, a medium molecular weight PVC resin. The GEON® resins are available from the Geon Company. The number average molecular weights of the PVC resins useful in the present invention may range from about 20,000 up to about 80,000, and a typical range of about 40,000 to about 60,000.

In another embodiment, the topcoat comprises at least one ionomer. Ionomers are polyolefins containing ionic bonding of molecular chains. Ionomer resins available from DuPont under the tradename Surlyn can also be used. These are identified as being derived from sodium, lithium or zinc and copolymers of ethylene and methacrylic acid. These include Surlyn 1601, which is a sodium containing ionomer having a melting point of 98° C., Surlyn 1605, which is a sodium containing ionomer having a melting point of about 90° C. and a $T_g$ of about −20.6° C., Surlyn 1650, which is a zinc containing ionomer having a melting point of 97° C., Surlyn 1652 which is a zinc containing ionomer having a melting point of 100° C., Surlyn 1702, which is a zinc containing ionomer having a melting point of 93° C., Surlyn 1705-1, which is a zinc containing ionomer having a melting point of 95° C., Surlyn 1707, which is a sodium containing ionomer having a melting point of 92° C., Surlyn 1802, which is a sodium containing ionomer having a melting point of 99° C., Surlyn 1855, which is a zinc containing ionomer having a melting point of 88° C., Surlyn 1857, which is a zinc containing ionomer having a melting point of 87° C., and Surlyn 1901, which is a sodium containing ionomer having a melting point of 95° C.

In one embodiment, the topcoat comprises a blend of a thermoplastic fluorinated polymer and an acrylic resin. In one embodiment, the topcoat contains the fluorinated polymer and acrylic resin as its principal components. The fluorinated polymer component includes a thermoplastic fluorocarbon such as polyvinylidene fluoride (PVDF). The fluorinated polymer also can include copolymers and terpolymers of vinylidene fluoride. The thermoplastic fluorocarbon useful in the topcoat is the polyvinylidene fluoride known as Kynar, a trademark of Pennwalt Corp. This polymer is a high molecular weight (400,000) polymer which provides a useful blend of durability and chemical resistance properties. Generally, a high molecular weight PVDF resin, with a weight average molecular weight of about 200,000 to about 600,000 is used.

The acrylic resin component of the topcoat can be a polymethyl methacrylate, or a polyethyl methacrylate resin, or mixtures thereof, including methacrylate copolymer resins, acrylate resins, and minor amounts of other comonomers. The topcoat also can include minor amounts of block copolymers and/or compatibilizers to stabilize the blended PVDF and acrylic resin system and provide compatibility between films.

In one embodiment, a principal component of the acrylic resin contained in the topcoat is a medium molecular weight polymethyl methacrylate resin such as Elvacite 2010, a trademark of Du Pont. (In all further references to Elvacite resins herein, it should be noted that Elvacite is a trademark of Du Pont for a group of its acrylic resins.) In another embodiment, a principal component of the acrylic resin for the topcoat can be a high molecular weight polyethyl methacrylate resin such as Elvacite 2042. The acrylic component of the topcoat also can comprise a mixture of Elvacite 2010 and a medium-to-high molecular weight polymethyl methacrylate resin such as Elvacite 2021. In a further embodiment, the acrylic resin component can comprise Elvacite 2042 and a low molecular weight polyethyl methacrylate resin such as Elvacite 2043. Other similar combinations of acrylic resins, their homopolymers and copolymers, may be used as a component of the topcoat. Generally, the acrylic resin component has a relatively high weight average molecular weight of about 50,000 to about 400,000.

The PVDF and acrylic-based topcoat formulation can be prepared as a solution of PVDF and acrylic resin in solvent. The PVDF and acrylic-based topcoat formulation also can be prepared as a dispersion of the PVDF in a solution of the acrylic resin. In one embodiment, the topcoat formulation can be prepared by mixing the acrylic resin with a suitable organic solvent and applying heat to dissolve the resin. The mixture is then allowed to cool sufficiently before adding the PVDF component so that the PVDF will not dissolve, but will be maintained as a dispersion in the acrylic-solvent based mixture. By maintaining the PVDF component as a dispersion in the topcoat, solvent evaporation during drying of the topcoat can be improved.

An example of composition of the dried topcoat comprises from about 50% to about 75% PVDF, and from about 25% to about 50% acrylic resin, by weight. In some instances, the maximum content of the PVDF component is about 72%, with the balance essentially comprising the acrylic resin. These solids ranges are based on the relative proportions of the PVDF and acrylic components only in the topcoat formulation. Other minor amounts of solids, such as UV stabilizers, block copolymers and compatibilizers also may be contained in the topcoat formulation.

The topcoat layer and the facestock may, and often do, contain UV light absorbers and/or other light stabilizers. Among the UV light absorbers that are useful are the hindered amine absorbers available from Ciba-Geigy under the trade designations "Tinuvin". The light stabilizers that can be used include the hindered amine light stabilizers available from Ciba-Geigy under the trade designations Tinuvin 111, Tinuvin 123, (bis-(1-octyloxy-2,2,6,6-tetramethyl-4-piperidinyl) sebacate; Tinuvin 622, (a dimethyl succinate polymer with 4-hydroxy-2,2,6,6-tetramethyl-1-piperidniethanol); Tinuvin 770 (bis-(2,2,6,6-tetramethyl-4-piperidinyl)-sebacate); and Tinuvin 783. Also useful light stabilizers are the hindered amine light stabilizers available from Ciba-Geigy under the trade designation "Chemassorb", especially Chemassorb 119 and Chemassorb 944. The concentration of the UV light absorber and/or light stabilizer is in the range of up to about 2.5% by weight, and in one embodiment about 0.05% to about 1% by weight.

The topcoat layer and the facestock may contain an antioxidant. Any antioxidant useful in making thermoplastic films can be used. These include the hindered phenols and the organo phosphites. Examples include those available from Ciba-Geigy under the trade designations Irganox 1010, Irganox 1076 or Irgafos 168. The concentration of the antioxidant in the thermoplastic film composition may be in the range of up to about 2.5% by weight, and in one embodiment about 0.05% to about 1% by weight.

The topcoat layer and the facestock may contain a metal deactivator. Any metal deactivator useful in making thermoplastic films can be used. These include the hindered phenol metal deactivators. Examples include those available from Ciba-Geigy under the trade designation Irganox 1024. The concentration of the metal deactivator in the thermoplastic film composition is in the range of up to about 1% by weight, and in one embodiment about 0.2% to about 0.5% by weight.

One of the features of the in-mold labels used in the method of the present invention is the presence of the second adhesive layer as the top or uppermost layer of the in-mold labels. As noted, the presence of the second adhesive layer permits the attachment of the in-mold label to an interior surface of the mold and which prevents the label from displacing or distorting prior to or during the molding process. The presence of the adhesive also facilitates the maintenance of the structural integrity of the label during the molding process. Any adhesive which is capable of adhering the label to an interior surface of the mold as the molding process is initiated can be utilized. In one embodiment of the present invention, the adhesive is a pressure sensitive adhesive (PSA) or a polymer having pressure sensitive adhesive characteristics (i.e., surface tack). The adhesive may be a radiation cured, chemically cured, moisture cured or heat cured adhesive. Radiation curable adhesives include those which can be cured with ultraviolet (UV) light, electron beam, x-ray, gamma-ray, buta-ray etc. UV light is particularly useful. The equipment for generating these forms of radiation or thermal curing are well known to those skilled in the art.

Pressure sensitive adhesive utilized herein may be any of a variety of pressure-sensitive adhesives (PSA) known in the art. Typically, the PSA layer has a thickness of from about 0.4 to about 1.6 mils (10 to about 40 microns). PSAs include silicone-based PSA adhesives and acrylic based PSAs as well as other elastomers such as natural rubber or synthetic rubber-containing polymers, or copolymers of styrene, butadiene, acrylonitrile, isoprene and isobutylene. In one embodiment, the PSAs are based on copolymers of acrylic acid esters, such as, for example, 2-ethyl hexyl acrylate, with polar comonomers such as acrylic acid. Acrylated urethanes also are useful. A variety of pressure sensitive adhesive materials are described in "Adhesion and Bond", *Encyclopedia of Polymer Science and Engineering*, Vol. 1, pages 476–546, Interscience Publishers, 2nd Ed. 1985, and the disclosure on these pages is hereby incorporated by reference. Other materials may be included in the adhesives such as tackifying resins, plasticizers, antioxidants, waxes, fillers, etc.

The adhesive layer may be formed from a solvent-based fluid adhesive composition. Commercially available acrylic PSAs in suitable solvents are available from a number of companies such as Monsanto, Ashland Chemical and National Starch. The radiation curable adhesive materials may contain photoinitiators and surfactants to provide a uniform flow resulting in an even coating.

The adhesives can be adapted to be vulcanized or crosslinked so as to render the adhesive compositions more resistant to elevated temperatures and to solvents while retaining a balance of adhesion and cohesion properties enabling the composition to remain tacky and pressure sensitive. Ultraviolet, high energy radiation or heat curing with any conventional diene elastomer curing system can be used. Other curing agents that can be used in the present invention are sulfur, peroxides, isocyanates and aluminum isopropylate. Examples of sulfur bearing accelerators are benzothiazyl disulfide, selenium diethyldithiocarbamate, commercially available as Selenac, dipentamethylene thiuram hexasulfide, commercially available as Sulfads and 4.4 dithiodiomorpholine, commercially available as Vannax A. Examples of peroxides are organic peroxides such as 2.5 bis (tert-butyl-peroxy)-2,5 dimethylene hexane. In one embodiment, an oil soluble heat reactive phenol formaldehyde resin is used as a curing agent by using about 5–40 parts of phenol formaldehyde resin with about per 100 of solid rubber. Preferably, 10–25 parts of phenol formaldehyde resin is used per 100 parts of solid rubber.

The resin curing agents mentioned above are combined with accelerators. Conventional accelerators such as zinc resinate or alkaline fillers, as disclosed in U.S. Pat. No. 3,625,752, or acid accelerators, such as disclosed in U.S. Pat. No. 3,231,419, can be used with the pressure sensitive adhesive and resin curing agents of the present invention. Preferably, zinc resinate is used as an accelerator and in amounts less than 40 parts to 100 of the solid rubber. Preferably, the zinc resinate as an accelerator is added in the amount of 5 to 25 parts to 100 parts of rubber.

This can be achieved by utilizing a photoactive crosslinking agent in conjunction with the photoinitiator. These include benzaldehyde, acetaldehyde, anthraquinone, substituted anthraquinones, various benzophenone-type compounds and certain chromophore-substituted vinylhalomethyl-s-triazines, such as 2,4-bis (trichloromethyl)-6-p-methoxystyryl-s-triazine.

Useful polyacrylic-functional crosslinking monomers include trimethylolpropane triacrylate, pentaerythritol tetracrylate and 1,2-ethylene glycol diacrylate. The diacrylate equivalent of a triacrylic-functional crosslinking monomer is moles triacrylate times 2/3 and of a tetracrylate-functional crosslinking monomer is moles tetracrylate times 1/2. polyacrylic-functional crosslinking monomer is ethylene glycol diacrylate.

Suitable commercially available U.V.-curable adhesives are sold by such commercial sources as Beacon Chemical Company, Inc., Acheson Colloids, Quretech and Northwest Coatings. Examples of such adhesives are Magnacryl 2793 (Beacon), ML 25184 (Acheson), JRX-1068 (Quretech) and U.V.-curable-10152 (Northwest). All of these sources produce adhesives that can be applied by a variety of known procedures as described below. Other examples of useful U.V. curable adhesives available from Beacon Chemical Company include Magnacryl UV 2601 Epoxy., Magnacryl 2296, and Magnacryl 2807. Magnacryl 2807 is believed to be a modified acrylic based adhesive. Another example of a useful commercially available adhesive material is Rad-Cure UV 1008 (a product of Rad-Cure Corporation identified as a U.V. curable, solvent-free adhesive containing 70–95% w multifunctional acrylate monomers, 5–20% w photoinitiator and 0–5% w surfactants.)

The second adhesive layer of the in-mold labels used in the method of the invention has surface tack which is sufficient to hold the label to an internal surface of a mold as the molding process is initiated. At the higher temperatures of a molding operation, the adhesion of the heat-activatable first adhesive layer to the molded article is greater than the adhesion of the second adhesive layer to the internal surface of the mold, and the label is transferred and permanently fixed to the molded article. In one embodiment, the 180° peel adhesion value of the surface of the second adhesive layer (on stainless steel at a rate of 12 inches per minute) may range from about 0.1 to about 2.5 g/inch width as determined by peel adhesion test method PSTC-1A (or ASTM D-1000). In other embodiments, the range may be from about 0.3 to about 2 g/inch width. The thickness of the second adhesive layer may be from about 0.1 to about 3 mils. In one embodiment the second adhesive layer has a thickness of from about 0.5 to about 1 mil.

The second adhesive layer, like the overcoat layer can be applied and cured using known techniques. The application techniques include gravure, reverse gravure, offset gravure, roll coating, brushing, knife-over roll, metering rod, reverse roll coating, doctor knife, dipping, die coating, spraying, curtain coating, flexographic, letter press, rotary screen, flat screen, and the like. The applied coating layers may be cured by exposure to heat or to known forms of radiation. Curing temperatures that may be used may range from about 40° C. to about 260° C., and in one embodiment about 40° C. to about 175° C., and in one embodiment about 40° C. to about 100° C., and in one embodiment about 40° C. to about 60° C.

The in-mold label films used in the invention may also comprise a carrier which is a release-coated liner having one surface (the release-coated surface) in contact with the otherwise exposed upper surface of the second adhesive layer. The carrier is used to protect the upper surface of the second adhesive layer during preparation, handling, storage and shipping of the labels. The carrier is removed from the label prior to positioning and adhering the label to an internal surface of the mold. The release-coated liner may comprise a substrate sheet of paper, a polymer film or combinations thereof coated with a release composition. The typical release coating used in the industry is a silicone-based molecule which can be cured either thermally or with irradiation energy such as ultraviolet light or electron beam. Paper substrates are useful when the second adhesive layer does not comprise a radiation curable adhesive. Paper is relatively inexpensive and has desirable properties such as antiblocking, antistatic, and dimensional stability, and can potentially be recycled. Any type of paper having sufficient tensile strength to be handled in conventional paper coating and treating apparatus can be employed as the substrate layer. Thus, any type of paper can be used depending upon the end use and particular personal preferences. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and papers having weights in the range of from about 60 to about 100 pounds per ream are presently preferred. The term "ream" as used herein equals 3000 square feet. Examples of specific papers which can be utilized as substrates in preparing the deposit laminates of the present invention include 41-pound offset grade bleached Kraft; 78-pound bleached Kraft paper, etc.

Alternatively, the substrate of the release-coated liner may be a polymer film, and examples of polymer films include polyolefins, polyesters, polyvinyl chlorides, polyvinyl fluorides (PVF), polyvinylidene difluorides (PVDF), etc., and combinations thereof. Polymer film carriers are useful particularly when the second adhesive is a radiation curable adhesive since the adhesive can be cured through the polymer film. The polyolefin films may comprise polymer and copolymers of monoolefins having from 2 to 12 carbon atoms or from 2 to about 4 or 8 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. In addition films may be extruded in mono or multilayers.

A third type of material used as a substrate for the release liner is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the liner. The weight of these types of liners ranges from 30 to 100 pounds per ream, with 40 to 94 pounds per ream representing a typical range. In total, the final liner is comprised of between 10% and 40% polymer and from 60% to 90% paper. For two sided coatings, the quantity of polymer is approximately evenly divided between the top and bottom surface of the paper.

The release coating which is contained on the substrate to form the release-coated liner or carrier sheet may be any release coating known in the art. Silicone release coatings are particularly useful, and any of the silicone release coating compositions which are known in the art can be used. The silicone release coatings described above can be utilized in the release coatings of the release liners.

The following examples illustrate the preparation of the in-mold label films which are useful in the method of the present invention. Unless otherwise indicated in the following examples, and elsewhere in the specification and claims, all parts and percentages are by weight, temperatures are in degrees centigrade, and pressure is at atmospheric pressure.

EXAMPLE I

This example illustrates the preparation of a white, surface-printed in-mold label film. The facestock utilized in this example is a white opaque clay modified polypropylene film available from HOP Industries. The film thickness is about 7.5 mil. The upper surface of the facestock is corona treated, and an ink adhesion promoting layer is applied to the corona treated surface at a coating weight of about 1.1 g/m$^2$ of the facestock via an anilox roll. The adhesion promoting material is CLBO-4275 F-Prokote Primer (a product of Sun Chemical Corp. identified as a solvent based primer). The adhesion promoting material is cured in an oven at a temperature of 40–50° C.

A multi-colored ink or print layer providing a pictorial design in combination with a printed message is applied over the adhesion promoting layer. The print layer is applied using a sequence of three anilox rolls. The following inks are used:

Roll 1: Yellow 116 ink (a UV curable ink provided by Daw Ink)

Roll 2: Red 186 ink (a UV curable ink provided by Daw Ink)

Roll 3: Black ink (a UV curable black ink provided by Werneke Ink)

Each ink application is UV cured prior to the application of the next ink. The print layer has a thickness of about 3 microns.

An adhesive layer (the second adhesive layer) is applied over the print layer with an anilox roll (flexographic). The material for the second adhesive layer is Magna-cryl 2807 from Beacon Chemical Co., and the second adhesive layer has a coating weight of about 4.5 g/m$^2$.

A 2 mil polyester film carrier sheet having a release coating layer on one of its sides is adhered to the second adhesive layer by laminating the carrier sheet with the release coating layer in contact with the surface of the second adhesive layer. The second adhesive layer is then UV cured to complete the fabrication of the in-mold label film.

Each ink application as well as the adhesion promoting layer and the UV cured second adhesive layer are cured using a medium pressure mercury bulb, and arc length of 45 cm, 500 watts per inch, a dichromatic reflector and a line speed of 65 feet per minute. The ink applications and adhesion promoting layer are cured using 50% power, while the second adhesive layer is cured using 100% power.

EXAMPLE II

This example illustrates the preparation of a clear, sub-surface printed label film construction. A clear polymer facestock film identified as Fasclear which is available from Avery Dennison Engineered Films Division, Avery Dennison Corp. is utilized in this example. The film has a thickness of about 6 mils. The lower surface of the facestock film is corona treated, and an ink adhesion promoting layer is applied (1.1 g/m$^2$) to the corona treated lower surface of the facestock via an anilox roll. The adhesion promoting material is CLBO-4275 F-Prokote Primer. The adhesion promoting material is cured in an oven at a temperature of 40–50° C.

A multicolored ink or graphics print layer providing a pictorial design in combination with a printed message is applied under the adhesion promoting layer. The ink or graphics print layer is applied using a sequence of three anilox rolls. The inks used in this example are the same as used in Example I. Each ink application is UV cured prior to the application of the next ink. The print layer has a thickness of about 3 microns. An adhesive layer (the second adhesive layer) is then applied to the upper surface of the facestock. The second adhesive layer material is Magna-cryl 2807 from Beacon Chemical Company. A 2 mil polyester release liner is laminated to the second adhesive layer with the release surface of the liner in contact with the second adhesive layer, and the second adhesive layer is then UV cured through the release liner. As in Example I, each ink application as well as the adhesion promoting layer and UV cured adhesive layer is cured using a medium pressure mercury bulb under the conditions specified in Example I.

After the in-mold label films as described above have been constructed, the films can be cut into a desired shape and size by die-cutting by techniques well known to those skilled in the art. The thus-produced label can be used as an in-mold label in differential pressure forming such as vacuum forming or pressure forming, blow molding in which compressed air is fed into a parison which expands to fill the mold, injection molding in which a molten resin is shaped by injecting into a mold, and in other molding techniques.

A variety of molded articles can be prepared and labeled in accordance with the method of the invention. Examples of labeled articles which can be prepared by injection molding include vacuum cleaners, lawn and garden equipment such as snow blowers, lawn mowers, hedge trimmers, etc., appliances, toys, mail boxes, and automotive parts etc. Examples of labeled molded articles which can be prepared by blow molding include plastic bottles and other containers.

In one embodiment, the labeled molded articles can be prepared by the method which comprises
(A) providing an in-mold label comprising:
(A-1) a polymer facestock having a printable upper surface and a heat activatable first adhesive lower surface; and
(A-2) a layer of a second adhesive overlying the upper surface of the facestock wherein the second adhesive layer has an upper surface and a lower surface;
(B) positioning and adhering the label to an interior molding surface of a mold by contacting the upper surface of the second adhesive layer of the label with the internal molding surface of the mold,
(C) molding an article from a heated thermoplastic resin contained within the mold whereby the heated resin contacts the layer of heat-activatable adhesive of the label, and the label is molded to the article,
(D) cooling the labeled article, and
(E) removing the labeled article from the mold.

In another embodiment, the labeled molded articles can be prepared by the method which comprises
(A) providing an in-mold label comprising:
(A-1) a polymer facestock having a printable upper surface and a heat activatable first adhesive lower surface; and
(A-2) a layer of a second adhesive overlying the upper surface of the facestock wherein the second adhesive layer has an upper surface and a lower surface;
(B) positioning and adhering the label in a mold cavity of an injection molding apparatus by contacting the upper surface of the second adhesive layer of the label with a wall of the mold cavity;
(C) injecting a thermoplastic resin under heat and pressure into the mold cavity so that the resin contacts the layer of second adhesive of the label thereby forming an article having the label bonded to an exposed surface of the article;
(D) cooling the thermoplastic resin to a solid form; and
(E) removing the labeled article from the mold cavity.

In yet another embodiment, the labeled molded articles can be prepared by the method which comprises
(A) providing an in-mold label comprising:
(A-1) a polymer facestock having a printable upper surface and a heat activatable first adhesive lower surface; and
(A-2) a layer of a second adhesive overlying the upper surface of the facestock wherein the second adhesive layer has an upper surface and a lower surface;
(B) positioning and adhering the label to an interior molding surface of a mold by contacting the upper surface of the second adhesive layer of the label with the internal molding surface of the mold,
(C) inserting a plastic article into the mold,
(D) bringing together, within the mold and in the presence of heat, the article being molded in the mold and said interior molding surface whereby the label is bonded to said hot molded article,
(E) cooling the labeled article, and
(F) removing the labeled article from the mold.

The thermoplastic resin which is injected into the mold or which constitutes the parison or plastic article introduced into the mold in a blow molding process must be capable of sufficiently bonding to the heat activatable first adhesive layer of the label. Generally, the composition of the heat activatable first adhesive layer is selected to be compatible with and capable of bonding to the thermoplastic resin of the molded article. Examples of useful thermoplastic resins include polycarbonates, ABS, blends of polycarbonates and ABS, halogenated polymers such as PVDF, nylons, etc. polyesters, polyamides and polyolefins such as polymers and copolymers of ethylene and propylene.

In practice, the label is placed in the cavity of the mold in such a manner that the second adhesive side of the label is in contact with an inner wall of the mold at a desired location. Prior to application to the inner wall of the mold, the surface of the adhesive layer may be provided with a static charge by procedures well known to those skilled in the art. The application of a static charge further increases the adherence of the label to the inner wall of the mold. In this manner, the method of the invention results in a plastic article which has the label united to the outer wall of the article by melt-bonding. The thus-obtained label plastic article exhibits tenacious adhesion between the body and the label, and essentially no distortion of the label is observed.

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method for producing a label-bearing molded article comprising:

(A) providing an in-mold label comprising:

(A-1) a polymer facestock having a printable upper surface and a heat activatable first adhesive lower surface;

(A-2) a layer of a second adhesive overlying the upper surface of the facestock wherein the second adhesive layer has an upper surface and a lower surface; and (A-3) a carrier sheet overlying the upper surface of the second adhesive layer;

(B) removing the carrier sheet;

(C) positioning and adhering the label to an interior molding surface of a mold by contacting the upper surface of the second adhesive layer of the label with the internal molding surface of the mold, (D) molding an article from a heated thermoplastic resin contained within the mold whereby the heated resin contacts the layer of heat-activatable adhesive of the label, and the label is molded to the article, (E) cooling the labeled article, and (F) removing the labeled article from the mold.

2. The method of claim 1 wherein the facestock comprises a single-layer construction.

3. The method of claim 1 wherein the facestock (A-1) comprises at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polycarbonate, or mixtures thereof.

4. The method of claim 1 wherein the label further comprises a print layer positioned between the upper surface of the facestock and the second adhesive layer.

5. The method of claim 1 wherein the facestock (A-1) comprises at least one polyolefin.

6. The method of claim 1 wherein the second adhesive layer comprises a radiation or thermally cured adhesive.

7. The method of claim 4 wherein the label further comprises an abrasion, chemical, and/or ultraviolet resistant transparent coating layer positioned between the print layer and the second adhesive layer.

8. The method of claim 4 wherein the label further comprises an adhesion promoting layer positioned between the print layer and the upper surface of the facestock.

9. A method for producing a label-bearing molded article comprising:

(A) providing an in-mold label comprising:

(A-1) a facestock having an upper surface and a lower surface wherein the upper surface is ink printable;

(A-2) a layer of a heat-activatable first adhesive underlying the lower surface of the facestock;

(A-3) a second adhesive layer overlying the upper surface of the facestock; and (A-4) a carrier sheet overlying the upper surface of the second adhesive layer, (B) removing the carrier sheet;

(C) positioning and adhering the label to an interior molding surface of a mold by contacting the upper surface of the second adhesive layer of the label with the internal molding surface of the mold, (D) molding an article from a heated thermoplastic resin contained within the mold whereby the heated resin contacts the layer of heat-activatable adhesive of the label, and the label is molded to the article, (E) cooling the labeled article, and (F) removing the labeled article from the mold.

10. The method of claim 9 wherein the facestock comprises a single-layered construction.

11. The method of claim 9 wherein the facestock (A-1) comprises a polymer film, textile, paper, foil or a metalized polymer film.

12. The method of claim 9 wherein the facestock comprises a polymer film.

13. The method of claim 9 wherein the facestock comprises two or more layers.

14. The method of claim 12 wherein the polymer film comprises at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of ethylene methacrylic acid, cellulosics, polyacrylonitrile alkylene-vinyl acetate copolymer, or mixtures of two or more thereof.

15. The method of claim 9 wherein the heat-activatable material is activatable at a temperature between about 80° C. and about 300° C.

16. The method of claim 9 wherein the facestock comprises a propylene polymer or a copolymer of propylene with ethylene.

17. The method of claim 9 wherein the second adhesive layer comprises a radiation cured adhesive.

18. The method of claim 9 wherein the label further comprises a print layer positioned between the upper surface of the facestock (A-1) and the second adhesive layer.

19. The method of claim 9 wherein the label further comprises a print layer positioned between the printable polymer film and the heat activatable first adhesive layer.

20. The method of claim 18 wherein the label further comprises an abrasion, chemical, and/or ultraviolet resistant transparent coating layer positioned between the print layer and the second adhesive layer.

21. The method of claim 18 wherein the label further comprises an adhesion promoting layer positioned between the print layer and the upper surface of the facestock.

22. The method of claim 19 wherein the label further comprises an adhesion promoting layer between the print layer and the heat-activatable first adhesive layer.

23. A method for producing a label-bearing molded article comprising:

(A) providing an in-mold label comprising:

(A-1) a polymer facestock having a printable upper surface and a heat activatable first adhesive lower surface;

(A-2) a layer of a second adhesive overlying the upper surface of the facestock wherein the second adhesive layer has an upper surface and a lower surface; and (A-3) a carrier sheet overflying the upper surface of the second adhesive layer, (B) removing the carrier sheet, (C) positioning and adhering the label in a mold cavity of an injection molding apparatus by contacting the upper surface of the second adhesive layer of the label with a wall of the mold cavity;

(D) injecting a thermoplastic resin under heat and pressure into the mold cavity so that the resin contacts the layer of second adhesive of the label thereby forming an article having the label bonded to an exposed surface of the article;

(E) cooling the thermoplastic resin to a solid form; and (F) removing the labeled article from the mold cavity.

24. The method of claim 23 wherein the facestock comprises a single-layered construction.

25. The method of claim 23 wherein the facestock (A-1) comprises at least one polyolefin, polyacrylate, polystyrene, polyamide, polyvinyl alcohol, poly(alkylene acrylate), poly (ethylene vinyl alcohol), poly(alkylene vinyl acetate), polyurethane, polyacrylonitrile, polyester, fluoropolymer, polycarbonate, or mixtures thereof.

26. The method of claim 23 wherein the label further comprises a print layer positioned between the upper surface of the facestock and the second adhesive layer.

27. The method of claim 23 wherein the facestock (A-1) comprises at least one polyolefin.

28. The method of claim 23 wherein the second adhesive layer comprises a radiation or thermally cured adhesive.

29. The method of claim 26 wherein the label further comprises an abrasion, chemical, and/or ultraviolet resistant transparent coating layer positioned between the print layer and the second adhesive layer.

30. The method of claim 26 wherein the label further comprises an adhesion promoting layer positioned between the print layer and the upper surface of the facestock.

31. The method of claim 26 wherein the upper surface of the facestock is corona treated.

32. A method for producing a label-bearing molded article comprising:
(A) providing an in-mold label comprising:
 (A-1) a facestock having an upper surface and a lower surface wherein the upper surface is ink printable;
 (A-2) a layer of a heat-activatable first adhesive underlying the lower surface of the facestock;
 (A-3) a second adhesive layer overlying the upper surface of the facestock; and
 (A-4) a carrier sheet overlying the upper layer of the second adhesive layer;
(B) removing the carrier sheet;
(C) positioning and adhering the label in a mold cavity of an injection molding apparatus by contacting the upper surface of the second adhesive layer of the label with a wall of the mold cavity;
(D) injecting a thermoplastic resin under heat and pressure into the mold cavity so that the resin contacts the layer of second adhesive of the label thereby forming an article having the label bonded to an exposed surface of the article;
(E) cooling the thermoplastic resin to a solid form; and
(F) removing the composite article from the mold cavity.

33. The method of claim 32 wherein the facestock comprises a single-layered construction.

34. The method of claim 32 wherein the facestock (A-1) comprises a polymer film, textile, paper, foil or a metalized polymer film.

35. The method of claim 32 wherein the facestock comprises a polymer film.

36. The method of claim 32 wherein the facestock comprises two or more layers.

37. The method of claim 32 wherein the heat-activatable material is activatable at a temperature between about 80° C. and about 300° C.

38. The method of claim 32 wherein the facestock comprises a propylene polymer or a copolymer of propylene with ethylene.

39. The method of claim 32 wherein the second adhesive layer comprises a radiation cured adhesive.

40. The method of claim 32 wherein the label further comprises a print layer positioned between the upper surface of the facestock (A-1) and the second adhesive layer.

41. The method of claim 32 wherein the label further comprises a print layer positioned between the printable polymer film and the heat activatable first adhesive layer.

42. The method of claim 40 wherein the label further comprises an abrasion, chemical, and/or ultraviolet resistant transparent coating layer positioned between the print layer and the second adhesive layer.

43. The method of claim 40 wherein the label further comprises an adhesion promoting layer positioned between the print layer and the upper surface of the facestock.

44. The method of claim 41 wherein the label further comprises an adhesion promoting layer between the print layer and the heat-activatable first adhesive layer.

45. The method of claim 32 wherein the facestock and the layer of heat-activatable adhesive comprises a coextrudate.

46. A method for producing a label-bearing molded article comprising:
(A) providing an in-mold label comprising:
 (A-1) a polymer facestock having an upper surface and a lower surface wherein the upper surface is ink printable;
 (A-2) a layer of a heat-activatable first adhesive underlying the lower surface of the facestock;
 (A-3) a radiation cured layer of a second adhesive overlying the upper surface of the facestock;
 (A-4) a print layer positioned between the printable layer and the second adhesive layer; and
 (A-5) a carrier sheet overlying the upper surface of the second adhesive layer,
(B) removing the carrier sheet,
(C) positioning and adhering the label in a mold cavity of an injection molding apparatus by contacting the upper surface of the second adhesive layer of the label with a wall of the mold cavity;
(D) injecting a thermoplastic resin under heat and pressure into the mold cavity so that the resin contacts the layer of second adhesive of the label thereby forming an article having the label bonded to an exposed surface of the article;
(E) cooling the thermoplastic resin to a solid form; and
(F) removing the composite article from the mold cavity.

47. The method of claim 46 wherein the polymer facestock (A-1) comprises at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polysulfone, polycarbonate, styrene-malaeic anhydride copolymer, styrene-acrylonitrile copolymer, ionomers based on sodium or zinc salts of ethylene methacrylic acid, cellulosics, polyacrylonitrile alkylene-vinyl acetate copolymer, or mixtures of two or more thereof.

48. The method of claim 46 wherein the heat-activatable material is activatable at a temperature between about 80° C. and about 300° C.

49. The method of claim 46 wherein the polymer facestock comprises a propylene polymer or a copolymer of propylene with ethylene.

50. The method of claim 46 wherein the second adhesive layer comprises a radiation cured adhesive.

51. The method of claim 46 wherein the label further comprises an abrasion, chemical, and/or ultraviolet resistant transparent coating layer positioned between the print layer and the second adhesive layer.

52. The method of claim 46 wherein the label further comprises an adhesion promoting layer positioned between the print layer and the upper surface of the facestock.

53. The method of claim 46 wherein the upper surface of the facestock is corona treated.

54. A method of producing a label-bearing molded article comprising:

(A) providing an in-mold label comprising:
   (A-1) a polymer facestock having a printable upper surface and a heat activatable first adhesive lower surface;
   (A-2) a layer of a second adhesive overlying the upper surface of the facestock wherein the second adhesive layer has an upper surface and a lower surface; and
   (A-3) a carrier sheet overlying the upper surface of the second adhesive layer;
(B) removing the carrier sheet;
(C) positioning and adhering the label to an interior molding surface of a mold by contacting the upper surface of the second adhesive layer of the label with the internal molding surface of the mold,
(D) inserting a plastic article into the mold,
(E) bringing together, within the mold and in the presence of heat, the article being molded in the mold and said interior molding surface whereby the label is bonded to said hot molded article,
(F) cooling the labeled article, and
(G) removing the labeled article from the mold.

55. The method of claim 54 wherein the facestock comprises a single-layered construction.

56. The method of claim 54 wherein the facestock (A-1) comprises at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, fluoropolymer, polycarbonate, or mixtures thereof.

57. The method of claim 54 wherein the label further comprises a print layer positioned between the upper surface of the facestock and the second adhesive layer.

58. The method of claim 54 wherein the facestock (A-1) comprises at least one polyolefin.

59. The method of claim 54 wherein the facestock comprises a propylene polymer or a copolymer of propylene with ethylene.

60. The method of claim 54 wherein the second adhesive layer comprises a radiation or thermally cured adhesive.

61. The method of claim 57 wherein the label further comprises an abrasion, chemical, and/or ultraviolet resistant transparent coating layer positioned between the print layer and the second adhesive layer.

62. The method of claim 57 wherein the label further comprises an adhesion promoting layer positioned between the print layer and the upper surface of the facestock.

* * * * *

UNITED STATES PATENT AND TRADEMARK OFFICE
CERTIFICATE OF CORRECTION

PATENT NO. : 6,773,653 B2
DATED : August 10, 2004
INVENTOR(S) : Miller et al.

It is certified that error appears in the above-identified patent and that said Letters Patent is hereby corrected as shown below:

Column 26,
Line 51, replace "overflying" with -- overlying --.

Signed and Sealed this

First Day of February, 2005

JON W. DUDAS
*Director of the United States Patent and Trademark Office*